United States Patent
Liu et al.

(10) Patent No.: US 8,547,952 B2
(45) Date of Patent: Oct. 1, 2013

(54) METHOD FOR SELECTING AN ENHANCED TRANSPORT FORMAT COMBINATION BASED ON DETERMINED POWER CONSUMPTION

(75) Inventors: Jinhua Liu, Beijing (CN); Qingyu Miao, Beijing (CN); Min Wang, Lulea (SE)

(73) Assignee: Telefonaktiebolaget L M Ericsson (Publ)., Stockholm (SE)

( * ) Notice: Subject to any disclaimer, the term of this patent is extended or adjusted under 35 U.S.C. 154(b) by 244 days.

(21) Appl. No.: 13/057,790

(22) PCT Filed: Aug. 8, 2008

(86) PCT No.: PCT/SE2008/050912
§ 371 (c)(1),
(2), (4) Date: Feb. 7, 2011

(87) PCT Pub. No.: WO2010/016787
PCT Pub. Date: Feb. 11, 2010

(65) Prior Publication Data
US 2011/0141960 A1 Jun. 16, 2011

(51) Int. Cl.
*H04B 7/216* (2006.01)
(52) U.S. Cl.
USPC ............ 370/342; 370/241; 370/465; 370/476
(58) Field of Classification Search
USPC .......................................... 370/338; 445/450
See application file for complete search history.

(56) References Cited

U.S. PATENT DOCUMENTS

| | | | |
|---|---|---|---|
| 2004/0043783 A1* | 3/2004 | Anderson | 455/522 |
| 2006/0111119 A1* | 5/2006 | Iochi | 455/450 |
| 2007/0155335 A1 | 7/2007 | Love et al. | |
| 2008/0013499 A1* | 1/2008 | Ratasuk et al. | 370/338 |
| 2008/0132184 A1* | 6/2008 | Wan et al. | 455/115.1 |
| 2013/0022028 A1* | 1/2013 | Niwano | 370/335 |

FOREIGN PATENT DOCUMENTS

| | | |
|---|---|---|
| EP | 1560352 A1 | 8/2005 |
| EP | 1811690 A1 | 7/2007 |
| WO | 2006046893 A1 | 5/2006 |
| WO | 2006113712 A1 | 10/2006 |
| WO | 2008008594 A2 | 1/2008 |

OTHER PUBLICATIONS

European Office Action issued in EP08794137.3-1246, dated Sep. 18, 2012, 5 pages.

* cited by examiner

*Primary Examiner* — Kevin C Harper
(74) *Attorney, Agent, or Firm* — Rothwell, Figg, Ernst & Manbeck, P.C.

(57) ABSTRACT

The present invention related to a method and an arrangement for selecting an enhanced transport format combination used for maximizing power utilization efficiency and power limitation avoidance in a communication network system comprising a communication network entity communicating with a plurality of user equipments on uplink and downlink channels over a radio interface. A power consumption for an acknowledgement/negative acknowledgement transmission and a channel quality indicator transmission is determined on an uplink channel during an enhanced dedicated channel transmission. Thereby, a transport format combination is selected based on said determined power consumption.

8 Claims, 7 Drawing Sheets

METHOD FOR SELECTING AN ENHANCED TRANSPORT FORMAT COMBINATION BASED ON DETERMINED POWER CONSUMPTION

CROSS-REFERENCE TO RELATED APPLICATION

This application is a 35 U.S.C. §371 National Phase Entry Application from PCT/SE2008/050912, filed Aug. 8, 2008, and designating the United States.

TECHNICAL FIELD

The present invention relates to a method and an arrangement in a communication network system and, more particular to an arrangement allowing for selecting an enhanced transport format combination as well as a method for such selection.

BACKGROUND

The High Speed Packet Access (HSPA) technology is deployed in the WCDMA platform and is still evolving, including the High Speed Uplink Packet Access (HSUPA) on the uplink and High Speed Downlink Packet Access (HS-DPA) on the downlink between a network side and a user equipment side of a communication network system. HSUPA technology is called Enhanced Uplink (EUL) by the third generation partnership project (3GPP). The main aim of EUL is to increase the uplink data transfer speed in the UMTS environment.

For EUL, there are two kinds of physical channels on the uplink: Enhanced Dedicated Physical Data CHannel (E-DP-DCH) and Enhanced Dedicated Physical Control CHannel (E-DPCCH). There may be several E-DPDCH on each radio link. The E-DPCCH is a physical channel used to transmit control information associated with the transport channel Enhanced Dedicated CHannel (E-DCH) which is mapped onto E-DPDCH. There is at most one E-DPCCH on each radio link. The E-DPCCH and E-DPDCH are transmitted in parallel.

The Hybrid Automatic Repeat reQuest (HARQ) profile is carried over E-DPCCH. HARQ is a mechanism designed to provide error correction and packet retransmission across the radio interface.

The High Speed Dedicated Physical Control CHannel (HS-DPCCH) exists on the uplink in EUL for transferring control information such as the HARQ ACK/NACK and CQI information.

There are two transmission time interval (TTI) length settings for EUL, 10 ms and 2 ms. In each TTI, the available E-DCH power is calculated as in Formula (1) and further illustrated in FIG. 2.

$$P_{E-DCH,available} = P_{MAX,UE} - P_{DPCCH} - P_{E-DPCCH} - P_{HS-DPCCH} \quad (1)$$

Where $P_{E-DCH,available}$ 21 is the available E-DCH power, $P_{MAX,UE}$ is the maximum UE transmit power, $P_{E-DPCCH}$ 23 is the E-DPCCH transmit power during the first slot of an E-DCH TTI and $P_{HS-DPCCH}$ 22 is the HS-DPCCH transmit power. $P_{DPCCH}$ 24 is the DPCCH transmit power.

The available E-DCH power is an input for Enhanced Transport Format Combination (E-TFC) selection. In an EUL system, there are multiple factors that affects the E-TFC selection, e.g. the EUL grant, the maximum available E-DCH power, the available E-DCH data and UE capability etc. By looking up the predetermined E-TFC table and considering all of the factors mentioned above, UE selects a maximum usable E-TFC. FIG. 3 illustrates an example of the E-TFC selection. The power needed for an E-DCH transmission is calculated from two power offsets relative to DPCCH. One power offset is associated with each E-TFC and one power offset is associated with the hybrid-ARQ profile. The resulting transmit power is then calculated by adding these two power offsets to the DPCCH power. When the required transmit power for different E-TFC set has been calculated, the UE may calculate which E-TFC set is possible to use from a power perspective. The UE then selects the E-TFC by maximizing the amount of data that can be transmitted given the power constraint and the scheduling grant. Thus, 33 denotes the required E-TFCs that can carry all of the available EUL data for a certain UE, 32 the serving grant and 33 denotes the usable E-TFCs that are determined by the available power. Then UE chooses E-TFC 1 which can use up the available E-DCH power.

The timing of a HSDPA channel is shown in FIG. 4. The High-Speed Share Controlled CHannel (HS-SCCH) is used to send the controlling information to the UE, including Transport-Format and Resource-related Information (TFRI), Internal Information and Hybrid-ARQ-related information. The High-Speed Downlink Shared Channel (HS-DSCH) starts to transmit two slots after the HS-SCCH transmission. The UE knows whether it should receive the followed HS-DSCH with the information in the first HS-SCCH slot. The ACK/NACK (A/N) information is sent over the High-Speed Dedicated Physical Control CHannel (HS-DPCCH) after the received HS-DSCH has been processed. The processing delay denoted X in FIG. 4, from the end of HS-DSCH reception to the start of HS-DPCCH transmission is about 5 ms.

The HS-DPCCH is the control channel with 2 ms TTI for transmitting the HARQ and channel quality information, which is called Acknowledged/Not Acknowledged (ACK/NACK) and downlink Channel Quality Indicator (CQI) respectively. The CQI and the ACK/NACK over HS-DPCCH are used in MAC-hs scheduler in the downlink. FIG. 5 shows the HS-DPCCH frame structure: ACK/NACK in the first slot, CQI feedback in the next two slots. Since the CQI feedback may be configured to be transmitted in a fixed cycle and the ACK/NACK feedback is only transmitted after UE received an HS-DSCH, the CQI and ACK/NACK feedback may not always be transmitted simultaneously. That is, it may be possible that Slot 1 carries ACK/NACK but Slot 2 and Slot 3 are not used or Slot 1 is not used but Slot 2 and Slot 3 carry CQI.

Currently, when calculating the available E-DCH power, only the HS-DPCCH power consumption in the first slot during the EUL TTI is considered, while the possible HS-DPCCH power consumption during the rest of the slots is not considered, i.e. for 10 ms EUL TTI case, the possible HS-DPCCH power consumption within 2~15th slot of the EUL TTI is not considered, and for 2 ms EUL TTI case, the possible HS-DPCCH power consumption within 2~3rd slot of the EUL TTI is not considered. This may cause UE power limitation, which results in:

E-DCH quality is decreased;
The UE gains unnecessarily high grant due to the E-DCH quality decrease;
HS-DPCCH quality is decreased.

FIGS. 6a and 6b illustrate an example that there is an ACK/NACK and/or CQI transmission when the UE is running EUL with the maximum transmit power for EUL 10 ms TTTI and 2 ms TTI respectively. In such cases, UE has to do scale the total transmit power to the maximum UE power according to predetermined strategy. Thus the E-DCH quality will be suffered.

SUMMARY

Accordingly, one objective with the present invention is to provide an improved method and arrangement for selecting an enhanced transport format combination used for maximizing power utilization efficiency and power limitation avoidance in a communication network system comprising a communication network entity communicating with a plurality of user equipments on uplink and downlink channels over a radio interface.

According to a first aspect of the present invention this objective is achieved through a method as defined in the characterising portion of claim 1, which specifies that an enhanced transport format combination is selected by a method which performs the steps of: determining a power consumption for an acknowledgement/negative acknowledgement transmission and a channel quality indicator transmission on an uplink channel during an enhanced dedicated channel transmission; and, selecting a transport format combination based on said determined power consumption.

According to a second aspect of the present invention this objective is achieved through an arrangement as defined in the characterising portion of claim 6, which specifies that an enhanced transport format combination is selected by an arrangement comprising means for determining a power consumption for an acknowledgement/negative acknowledgement transmission and a channel quality indicator transmission on an uplink channel during an enhanced dedicated channel transmission; and, means for selecting a transport format combination based on said determined power consumption.

Further embodiments are listed in the dependent claims.

Thanks to the provision of a method and an arrangement, which select the E-TFC based on the power consumption during a transmission, the uplink resource utilization efficiency is improved and the robustness of the uplink outer loop power control is enhanced.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
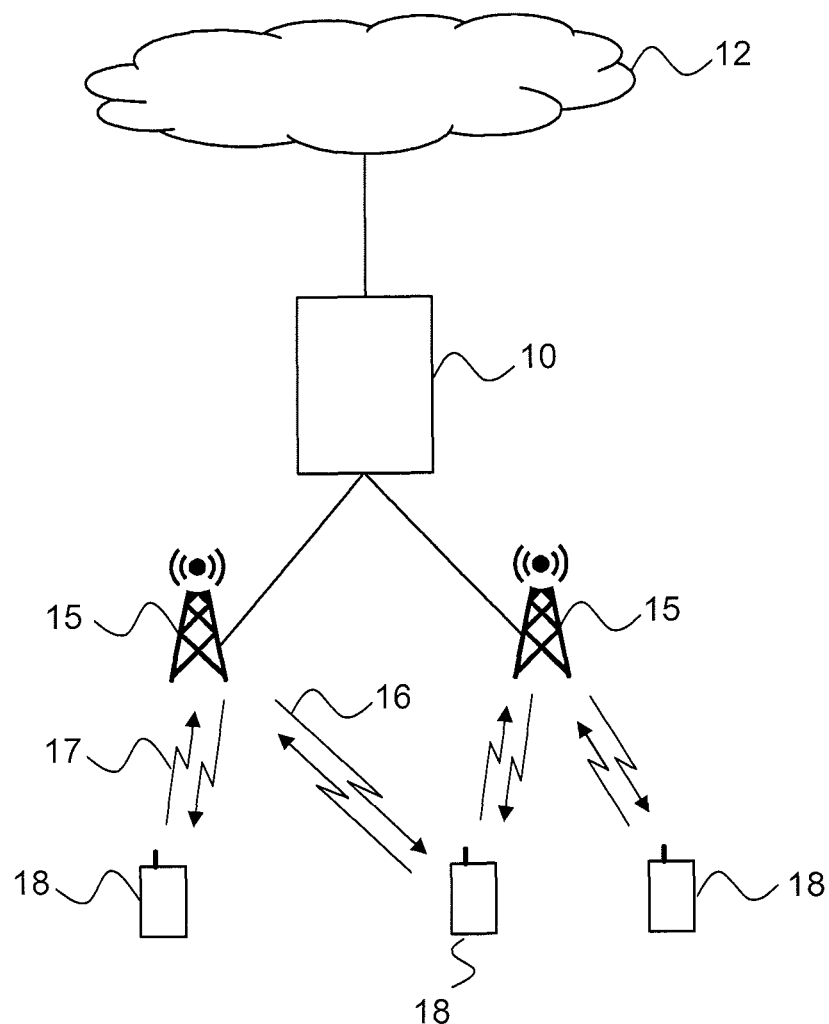
FIG. 1 shows a communication network architecture according to the present invention.
Figure 2:
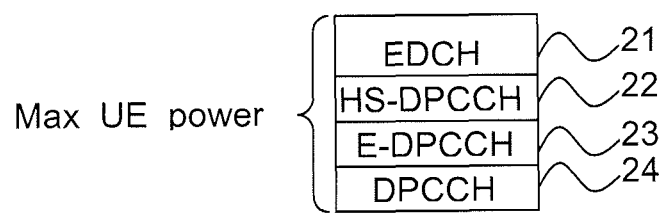
FIG. 2 shows available E-DCH power.

FIG. 1 depicts a communication system including a Radio Access Network (RAN), such as the UMTS Terrestrial Radio Access Network (UTRAN) architecture, comprising at least one Radio Base Station (RBS) (eNode B or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15 transmits to each user equipment 18 at respective power level. On the uplink channel 17, the user equipments 18 transmit data to the RBS 15 at respective power level.

According to a preferred embodiment of the present invention, the communication system is herein described as a WCDMA communication system. The skilled person, however, realizes that the inventive method and arrangement works very well on other packet based communications systems as well. The user equipments 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

According to one embodiment of the present invention, the enhanced transport format combination (E-TFC) is selected based on the high speed dedicated physical control channel (HS-DPCCH) power consumption during an enhanced dedicated channel (E-DCH) transmission. In order to predict the HS-DPCCH power consumption, the power consumptions of the channel quality indicator (CQI) transmission and ACK/NACK transmission sent over the HS-DPCCH is predicted by the UE. The CQI transmission is determined using the predetermined CQI feedback cycle and the ACK/NACK transmission is predicted based on the high speed shared control channel (HS-SCCH) reception. The CQI transmit power and ACK/NACK transmit power is set relative to the DPCCH transmit power with a predetermined CQI power offset and ACK/NACK power offset respectively. Hence the CQI and ACK/NACK transmit power in the near future can be predicted based on the current DPCCH transmit power plus the related power offsets.

Because each UE knows whether the followed HS-DSCH is for this particular UE or not, after that 2 slots of the HS-SCCH has been received, the ACK/NACK transmission power consumption is predicable within 9 ms (2 ms HS-DSCH TTI+5 ms processing delay+2 ms HS-DPCCH TTI). The ACK/NACK transmission power consumption is predicted within ~9 ms out of 10 ms. For the 2 ms EUL TTI case, this is long enough. For the 10 ms EUL TTI case, the last 1 ms of a TTI is not predictable. The UE also knows when the CQI is transmitted because CQI is transmitted with a fixed cycle. When selecting the E-TFC, the UE predicts the amount of the power consumption by the ACK/NACK transmission and CQI transmission during the E-DCH frame except that the possible ACK/NACK transmission in the last slot of the coming E-DCH frame is not predictable for the 10 ms EUL TTI case. Thus, Formula (1) may be improved to be:

$$P_{E\text{-}DCH,available} = P_{MAX,UE} - P_{DPCCH} - P_{E\text{-}DPCCH} - P_{predictable,HS\text{-}DPCCH} \quad (2)$$

Where $P_{predictable,HS\text{-}DPCCH}$ is the predictable power consumption by HS-DPCCH during the whole E-DCH TTI.

Then the E-TFCI is selected based on the available E-DCH power calculated by Formula (2). Thus, the UE power limitation as in prior art is avoided as shown in FIGS. 7a and 7b.

Figure 6A:
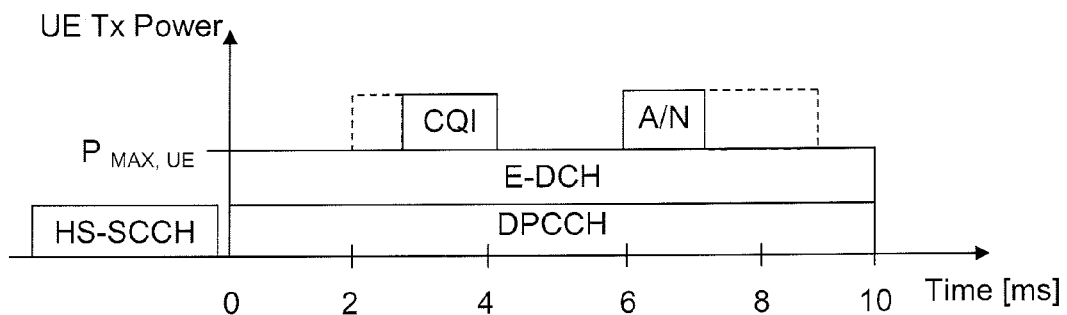
FIG. 6 illustrates an example of possible UE power limit according to prior art.
Figure 6B:
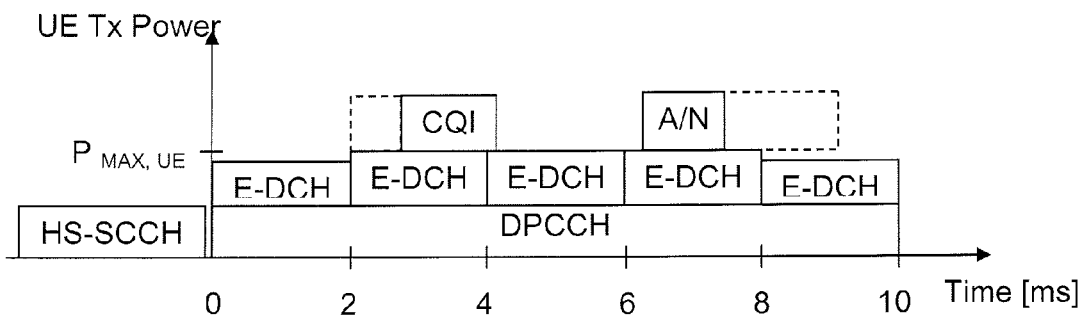
Figure 7A:
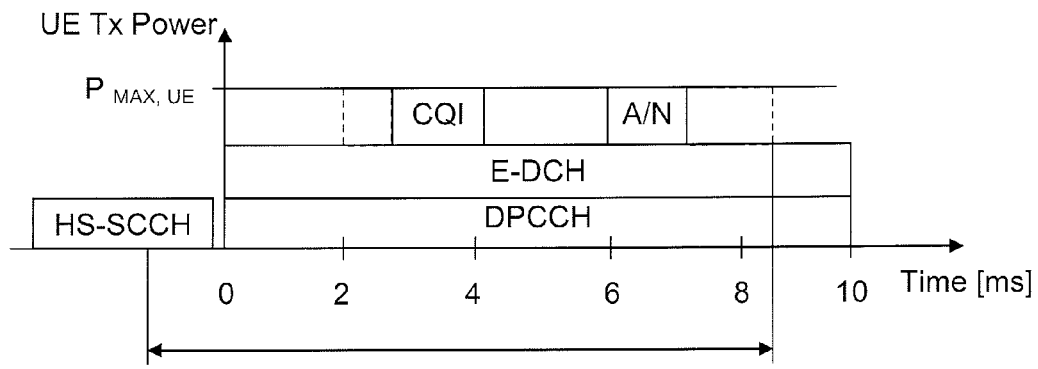
FIG. 7 illustrates an example of avoiding UE power limit according to an embodiment of the present invention.
Figure 7B:
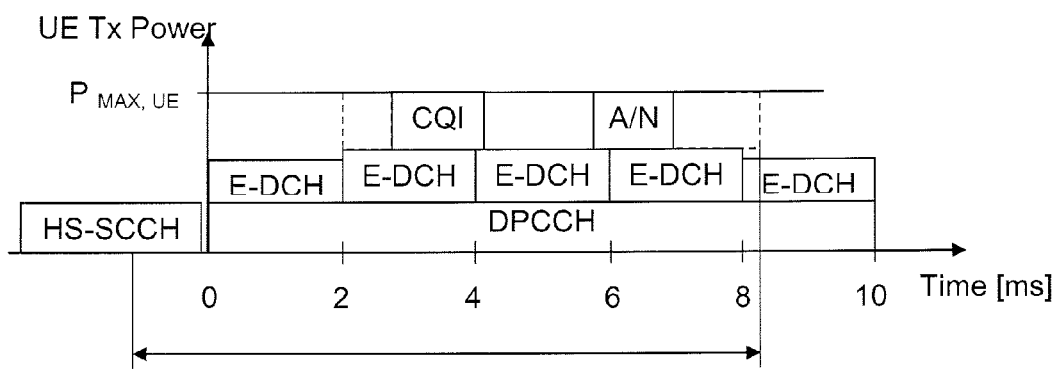

FIG. 7a shows an example of the inventive method according to one embodiment for the case that TTI is 10 ms. FIG. 7b shows an example of the inventive method according to one embodiment for the case that TTI is 2 ms. As can be seen from FIGS. 7a and 7b compared to FIGS. 6a and 6b, there will be no power limitation when the predictable power consumption by HS-DPCCH during the whole E-DCH TTI is considered, i.e. enough power for HS-DPCCH is reserved.

Figure 8:
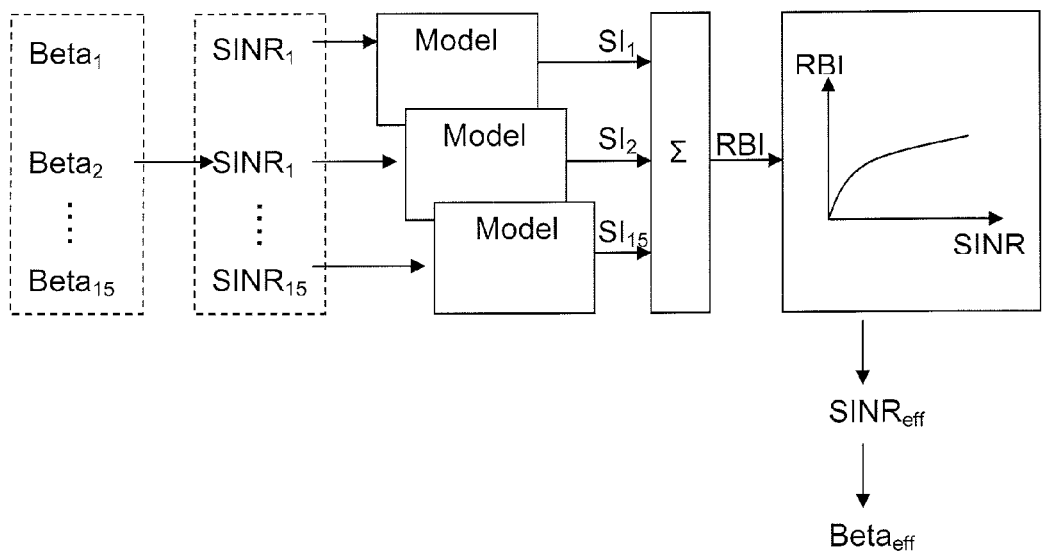
FIG. 8 shows another embodiment of the present invention.

According to another embodiment of the present invention, the E-TFC selection is mutual information based. The UE estimates the effective power offset for the whole TTI based on the predicted power offset of each slot. This is shown in FIG. 8.

Assuming one coding block consists of M slots, each of which contains K modulated symbols, RBI expresses the block-level channel capacity, and Received Symbol Information (RSI) expresses the slot-level channel capacity. For the received L slots at the receiver, which experiences multiple channel state $\{\gamma_1, \gamma_2, \ldots, \gamma_L\}$, the received RBI is expressed as:

$$RBI_L = \sum_{m=1}^{L} RSI_m, \quad L \leq M \quad (3)$$

$$RSI_m = K \cdot I(\gamma_m) \quad (4)$$

where $I(\gamma_m)$ is the symbol-level mutual information. Besides the definition of $I(\gamma_m)$ in [[ETC/WF Wan Lei, "A Link-to-System Interface Based on Mutual Information", ETC/WF-04:004, A, Mar. 8, 2004.]], there are other approximate expressions [EED/N/RA Udo Wachsmann & Mathias Pauli, "Novel Link Quality Estimation for Coded Transmission on Fading Channels", EED/N/RA-02:055, A, Mar. 4, 2003]] as below.

$$I_{EESM}(\gamma_m) = 1 - e^{-\gamma_m} \quad (5)$$

$$I_{R0}(\gamma_m) = 1 - \log_2(1 + e^{-\gamma_m/2}), \text{ BPSK cutoff rate} \quad (6)$$

$$I_{Gauss}(\gamma_m) = \frac{1}{2}\log2(1 + \gamma_m), \text{ AWGN capacity,}$$
real Gaussian input $\quad (7)$ $$I_{log}(\gamma_m) = \log(\gamma_m) \quad (8)$$

$$I_{lin}(\gamma_m) = \gamma_m \quad (9)$$

For a certain codec, the relation between RBI and BLER or any other quality indicators are described in prior art. Therefore, given quality requirement, $RBI_{target}$ can be obtained by checking out AWGN performance of the codec.

The UE predicts the ACK/NACK transmission power consumption and CQI transmission power consumption, which means that UE may predict the available E-DCH power for each slot. Based on the available E-DCH power of each slot, the UE is able to calculate the available Signal to Interference-plus-Noise Ratio (SINR) of each slot, which is converted to symbol information of each slot. After that, the Received Block Information (RBI) of the EUL TTI is calculated which may be converted to the available effective SINR for the whole EUL TTI by checking out AWGN performance of the codec. Based on the available effective SINR, the available effective power offset (or beta value) is obtained. The E-TFC is then selected based on the available effective power offset (availablePowerOffset$_{effective}$) as well as other factors such as the EUL grant, the maximum available E-DCH power, the available E-DCH data and UE capability etc. Suppose the required power offset of the selected E-TFC is PowerOffset$_{required}$ (PowerOffset$_{required}$≤availablePowerOffset$_{effective}$), then the used E-DCH power offset in each slot can be as following:

$$usedPowerOffset_i = \frac{PowerOffset_{required}}{availablePowerOffset_{effective}} * PowerOffset_{available,i} \quad (10)$$

Where i is the slot number of this TTI (0≤i≤14 for EUL 10 ms TTI case and 0≤i≤2 for EUL 2 ms TTI case); usedPowerOffset$_i$ is the used E-DCH power offset in Slot i; PowerOffset$_{available,i}$ is the available E-DCH power offset of Slot i.

By such a method, the effective E-DCH power offset is equal to PowerOffset$_{required}$ although the used E-DCH power offset of each slot may not be equal to PowerOffset$_{required}$.

Figure 9:
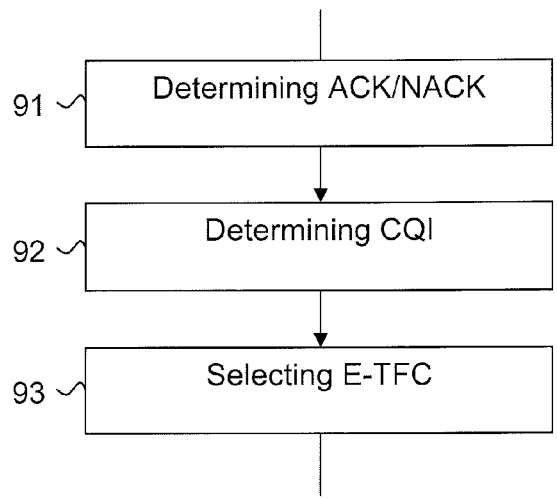
FIG. 9 is a flowchart showing the inventive method steps according to a general embodiment of the present invention.

According to a general embodiment of the present invention, the procedure for selecting an enhanced transport format combination used for maximizing the power utilization efficiency and power limitation avoidance in a communication network system comprising a communication network entity communicating with a plurality of user equipments on uplink and downlink channels over a radio interface, shown in FIG. 9, is as follows:

determining a power consumption for an acknowledgement/negative acknowledgement transmission on an uplink channel during an enhanced dedicated channel transmission (step 91). According to some embodiments, the ACK/NACK transmission power consumption is determined based on a high speed shared control channel reception;

determining a power consumption for a channel quality indicator transmission on an uplink channel during an enhanced dedicated channel transmission (step 92). According to some embodiments the CQI power consumption is determined by using a pre-determined channel quality indicator feedback cycle;

selecting a transport format combination based on said determined power consumption (step 93).

Figure 10:
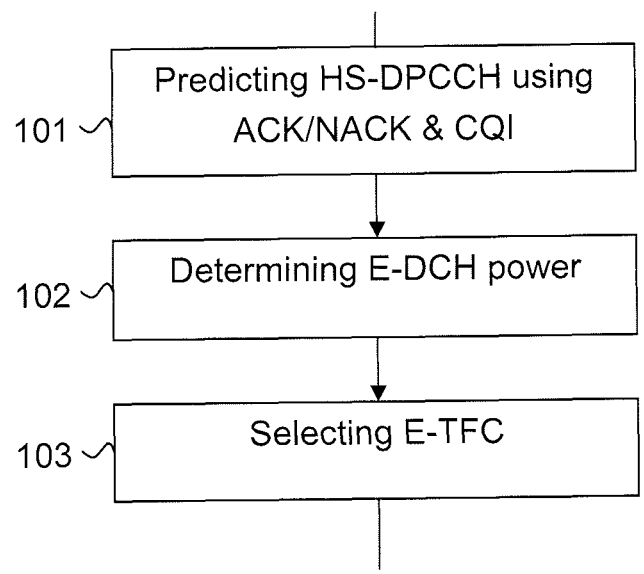
FIG. 10 is a flowchart showing the inventive method steps according to some embodiments of the present invention.

According to some embodiments of the present invention, the procedure as shown in FIG. 10, further comprises the steps of:

using said determined power consumption for predicting a high speed dedicated physical control channel power consumption during a whole transmission time interval of said enhanced dedicated channel transmission (step 101);

determining an available power for said enhanced dedicated channel transmission using said predicted high speed dedicated physical control channel power consumption (step 102); and, selecting said enhanced transport format combination based on said determined available power for said enhanced dedicated channel transmission (step 103).

Figure 11:
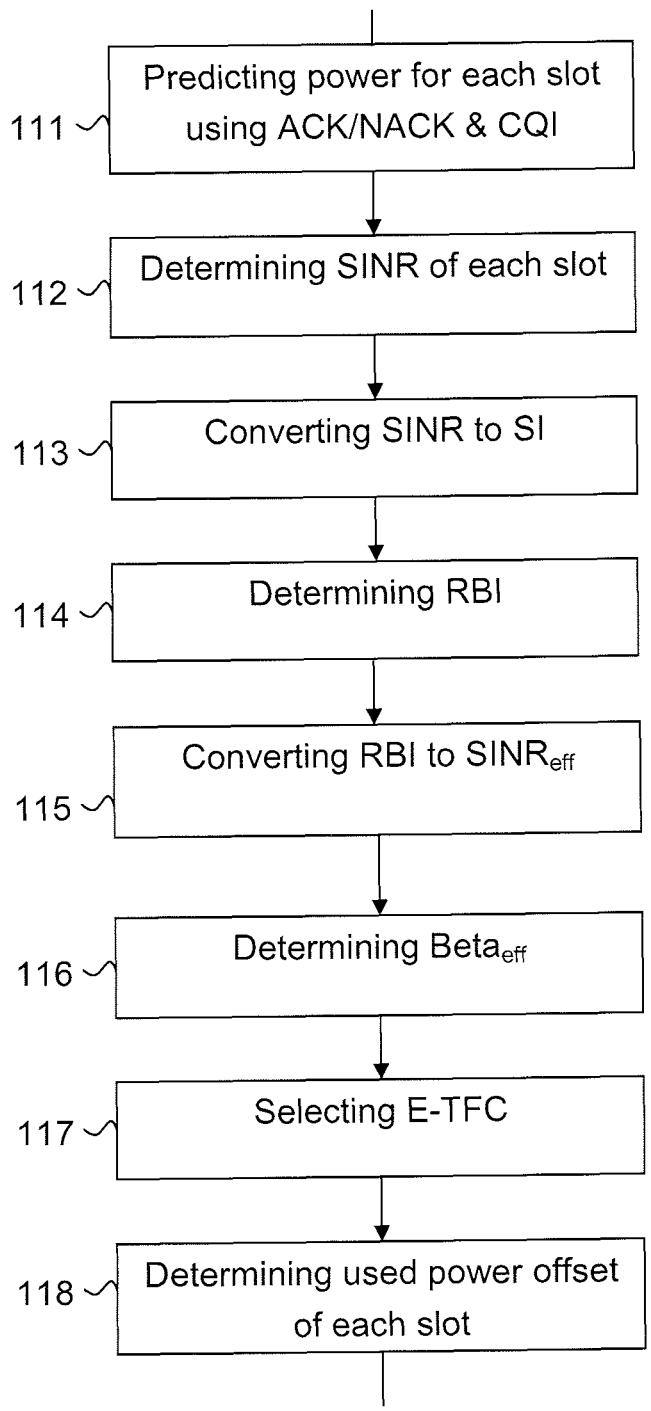
FIG. 11 is a flowchart showing the inventive method steps according to some embodiments of the present invention.

According to some embodiments of the present invention, the procedure as shown in FIG. 11, further comprises the steps of:

using said determined power consumption for predicting available power for each transmission slot of said enhanced dedicated channel transmission (step 111);

determining available signal to interference-plus-noise ratio of each transmission slot based on said predicted available power for each transmission slot (step 112);

converting said determined available signal to interference-plus-noise ratio of each transmission slot to symbol information of each transmission slot (step 113);

determining a received block information for whole transmission time interval of said enhanced dedicated channel transmission based on said symbol information of each slot (step 114);

converting said determined received block information to an available effective signal to interference-plus-noise ratio for said whole transmission time interval of said enhanced dedicated channel transmission (step 115);

determining an available effective power offset value based on said available effective signal to interference-plus-noise ratio (step 116); and, selecting said enhanced transport format combination based on said determined available effective power offset value (step 117);

determining the used power offset of each slot for the selected transport format combination based on the required power offset of the selected transport format combination, the said determined available effective power offset value and the available power offset of each slot (Step 118).

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electro-magnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of selecting an enhanced transport format combination used for maximizing power utilization of and power limitation avoidance in a communication network system comprising a communication network entity communicating with a plurality of user equipments on uplink and downlink channels over a radio interface, comprising:

determining a power consumption for an acknowledgement negative acknowledgement transmission and a channel quality indicator transmission on an uplink channel during an enhanced dedicated channel transmission;

using said determined power consumption for predicting available power for each transmission slot of said enhanced dedicated channel transmission;

determining available signal to interference-plus-noise ratio of each transmission slot based on said predicted available power for each transmission slot;

converting said determined available signal to interference-plus-noise ratio of each transmission slot to symbol information of each transmission slot;

determining a received block information for whole transmission time interval of said enhanced dedicated channel transmission based on said symbol information of each slot;

converting said determined receive block information to an available effective signal to interference-plus-noise ratio for said whole transmission time interval of said enhanced dedicated channel transmission;

determining an available effective power offset value based on said available effective signal to interference-plus-noise ratio; and selecting said enhanced transport format combination based on said determined available effective power offset value.

2. The method of claim 1, further comprising:
using said determined power consumption for predicting a high speed dedicated physical control channel power consumption during a whole transmission time interval of said enhanced dedicated channel transmission;
determining an available power for said enhanced dedicated channel transmission using said predicted high speed dedicated physical control channel power consumption; and
selecting said enhanced transport format combination based on said determined available power for said enhanced dedicated channel transmission.

3. The method of claim 1, wherein said acknowledgement/negative acknowledgement transmission power consumption is determined based on a high speed shared control channel reception.

4. The method of claim 1, wherein said channel quality indicator power consumption is determined by using a pre-determined channel quality indicator feedback cycle.

5. An arrangement for selecting an enhanced transport format combination used for maximizing power utilization efficiency and power limitation avoidance in a communication network system comprising a communication network entity communicating with a plurality of user equipments on uplink and downlink channels over a radio interface, comprising:
means for determining a power consumption for an acknowledgement/negative acknowledgement transmission and a channel quality indicator transmission on an uplink channel during an enhanced dedicated channel transmission;
means for using said determined power consumption for predicting available power for each transmission slot of said enhanced dedicated channel transmission;
means for determining available signal to interference-plus-noise ratio of each transmission slot based on said predicted available power for each transmission slot;
means for converting said determined available signal to interference-plus-noise ratio of each transmission slot to symbol information of each transmission slot;
means for determining a received block information for whole transmission time interval of said enhanced dedicated channel transmission based on said symbol information of each slot;
means for convening said determined receive block information to an available effective signal to interference-plus-noise ratio for said whole transmission time interval of said enhanced dedicated channel transmission;
means for determining an available effective power offset value based on said available effective signal to interference-plus-noise ratio;
means for selecting said enhanced transport format combination based on said determined available effective power offset value.

6. The arrangement of claim 5, further comprising:
means for using said determined power consumption for predicting a high speed dedicated physical control channel power consumption during a whole transmission time interval of said enhanced dedicated channel transmission;
means for determining an available power for said enhanced dedicated channel transmission using said predicted high speed dedicated physical control channel power consumption; and
means for selecting said enhanced transport format combination based on said determined available power for said enhanced dedicated channel transmission.

7. The arrangement of claim 5, wherein said means for determining an acknowledgement/negative acknowledgement transmission power consumption is arranged to determine said acknowledgement/negative acknowledgement transmission power consumption based on a high speed shared control channel reception.

8. The arrangement of claim 5, wherein said means for determining a channel quality indicator power consumption is arranged to determine said channel quality indicator power consumption by using a pre-determined channel quality indicator feedback cycle.

* * * * *

UNITED STATES PATENT AND TRADEMARK OFFICE
CERTIFICATE OF CORRECTION

PATENT NO. : 8,547,952 B2  
APPLICATION NO. : 13/057790  
DATED : October 1, 2013  
INVENTOR(S) : Liu et al.

Page 1 of 1

It is certified that error appears in the above-identified patent and that said Letters Patent is hereby corrected as shown below:

On Title Page, item (73), under "Assignee", in Column 1, Line 2, delete "(publ).," and insert -- (publ), --, therefor.

On the Title Page, in the Figure, delete " 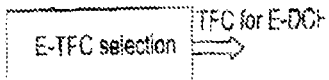 " and insert -- 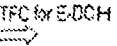 --, therefor.

In the Drawings

Figure 3:
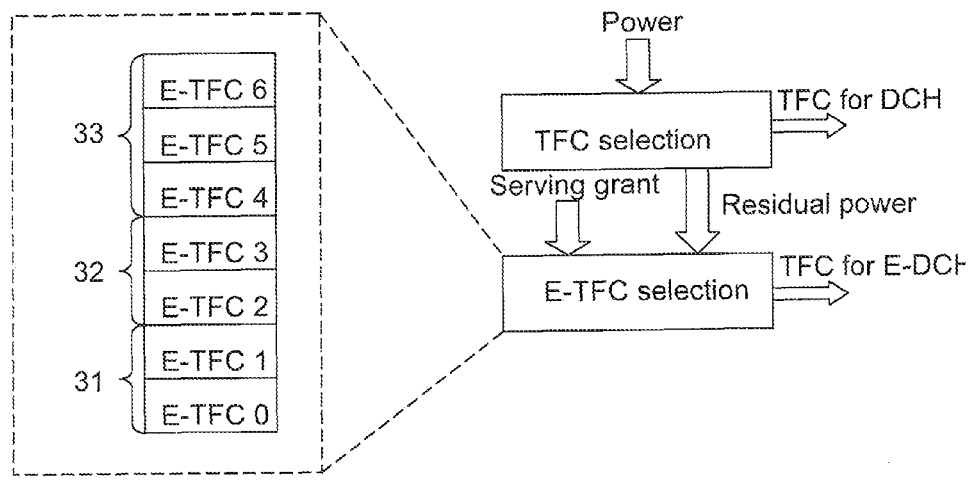
FIG. 3 illustrates the E-TFC selection process according to prior art.
Figure 4:
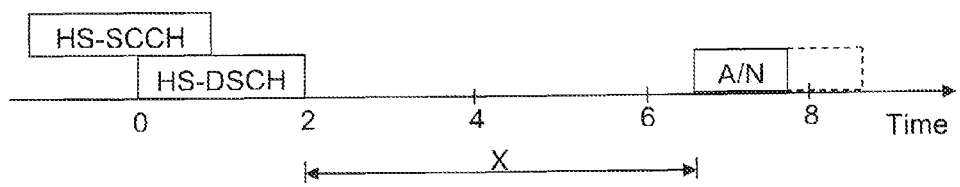
FIG. 4 shows the timing of the HSDPA channel according to prior art.
Figure 5:
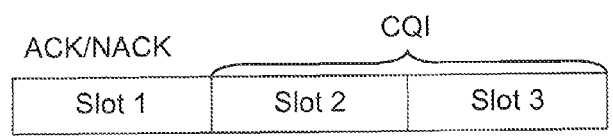
FIG. 5 shows the frame structure of a HS-DPCCH channel.

In Fig. 3, Sheet 2 of 7, delete " 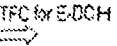 " and insert -- 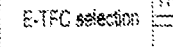 --, therefor.

In the Specifications

In Column 5, Line 8, in Formula (2), delete "$P_{predicctable,HS-DPCCH}$" and insert -- $P_{predictable, HS-DPCCH}$ --, therefor.

In the Claims

In Column 8, Line 38, in Claim 1, delete "of" and insert -- efficiency --, therefor.

In Column 8, Lines 43-44, in Claim 1, delete "acknowledgement" and insert -- acknowledgement/ --, therefor.

In Column 10, Line 8, in Claim 5, delete "convening" and insert -- converting --, therefor.

Signed and Sealed this  
Fourth Day of February, 2014

Michelle K. Lee  
*Deputy Director of the United States Patent and Trademark Office*